United States Patent [19]

Walker

[11] 4,266,795

[45] May 12, 1981

[54] FORKLIFT TOWING STRUCTURE

[76] Inventor: Donald G. Walker, 330 Grandview Cir., Camarillo, Calif. 93010

[21] Appl. No.: 86,753

[22] Filed: Oct. 22, 1979

[51] Int. Cl.³ .............................................. B60D 1/04
[52] U.S. Cl. ................................ 280/402; 280/460 R; 280/461 R; 280/490 R; 280/495; 414/467
[58] Field of Search ............... 280/402, 460 R, 456 R, 280/415 R, 418, 478 R, 490 R, 414.5, 405 R, 407, 400, 43.23, 763, 495, 408, 504, 461 R; 180/11, 14 R; 296/158; 254/86 R, 86 H; 414/467, 462

[56] References Cited

U.S. PATENT DOCUMENTS

| | | | |
|---|---|---|---|
| 2,495,493 | 1/1950 | Wright | 280/418 |
| 2,717,783 | 9/1955 | Flink | 280/460 R X |
| 3,640,192 | 2/1972 | Mauldin | 280/43.23 X |
| 3,799,379 | 3/1974 | Grether | 414/467 |

*Primary Examiner*—Joseph F. Peters, Jr.
*Assistant Examiner*—Randall A. Schrecengost
*Attorney, Agent, or Firm*—Ralph B. Pastoriza

[57] ABSTRACT

The rear portion of a load hauling flatbed truck and the front portion of a conventional forklift vehicle are provided with structures facilitating towing of the forklift vehicle by the truck to a remote site so that the forklift vehicle is available for loading and/or unloading materials onto or from the flatbed truck. Basically, left and right rocking levers intermediately pivoted adjacent to left and right front corner portions of the forklift vehicle are hydraulically rocked so that the extending front portions of the rocking members engage about engagement structures secured adjacent to the left and right rear corners of the truck and thereby effect a lifting of the entire front portion of the forklift vehicle when the rocking members are rocked downwardly. Appropriate locking pins are inserted to secure the rocking members to the rear corner portions of the towing truck. The entire front wheels of the forklift vehicle are raised free of the ground so that towing operations result in only the rear wheels engaging the ground. The longitudinal fore and aft axes of the vehicle and truck remain in the same plane during towing operations.

4 Claims, 7 Drawing Figures

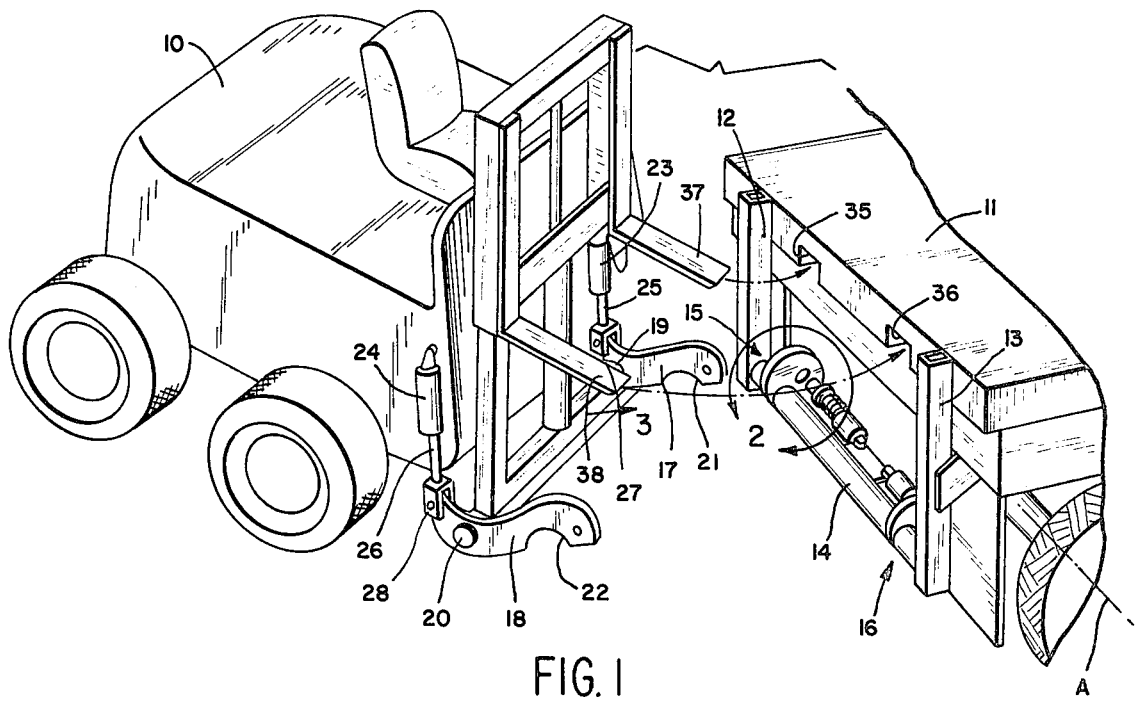
FIG. 1
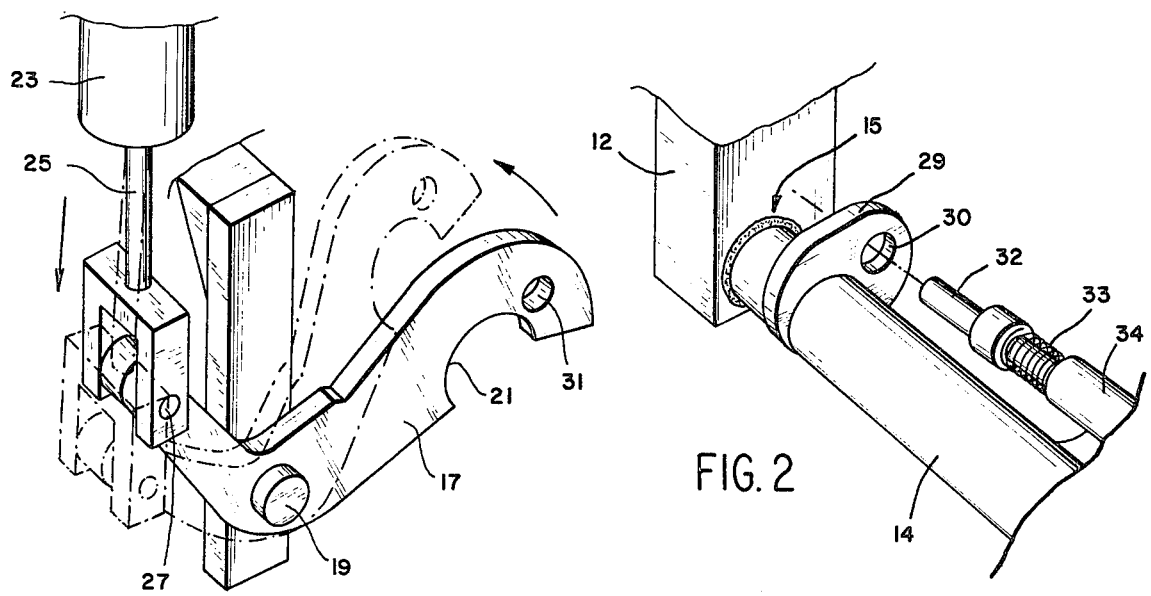
FIG. 2
FIG. 3
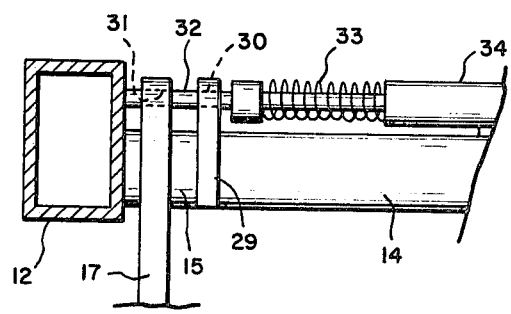
FIG. 4

FORKLIFT TOWING STRUCTURE

This invention relates generally to towing structures and more particularly to an improved towing structure for use in towing a forklift vehicle behind a load hauling flatbed truck with which the forklift vehicle is to be used at a remote site for loading and/or unloading operations.

BACKGROUND OF THE INVENTION

In the hauling of materials to or from remote sites, more often than not a truck operator must wait at the site to which material is delivered for a customer or other user to remove the shipped material from his truck. Normally, this operation is carried out by a conventional forklift vehicle owned by the customer or rented by the customer to remove the material from the truck. However, in many instances such a forklift vehicle is not available or is being used elsewhere. As a consequence, the truck driver must wait until such a forklift can be obtained to unload his truck or resort to other more costly and time-consuming means to unload his truck.

The same situation obtains in picking up material at a remote site. Unless a forklift vehicle is available, the trucker in many instances must wait for long periods of time until one can be obtained or alternatively load the truck by hand.

The foregoing problem could be resolved if the truck operator could simply bring a forklift vehicle with him for loading and/or unloading operations at a remote site. By such an arrangement, all of the foregoing problems could be overcome. On the other hand, the towing or hauling of a forklift vehicle to a remote site by the truck poses serious problems. If conventional trailer hitches are used, the forklift vehicle rides on all four wheels resulting in a churning of the transmission power train with consequent wear. Moreover, if a tire should blow out on the forklift vehicle with all four wheels on the ground while being towed, severe damage can result.

Conventional forklift vehicles themselves are extremely heavy and normally are powered through the front wheels. They simply are not susceptible to ready use with conventional towing structures. For example, most towing arrangements even those which serve to lift entirely the front portion of a vehicle have a single point coupling to the rear of the towing vehicle. As a result, swaying can occur and such swaying would be very difficult to control with a relatively heavy vehicle such as a forklift. Moreover, the tines of the fork of the forklift itself often get in the way of any appropriate type of towing mechanism unless they are raised to a high level to override the top of a flat truck bed. In this latter instance, they may interfere with a load being hauled by the truck.

BRIEF DESCRIPTION OF THE PRESENT INVENTION

With all of the foregoing considerations in mind, the present invention contemplates the provision of an improved towing structure particularly adapted and designed to solve the problems of towing a forklift vehicle behind a flatbed truck.

Briefly, this improved structure includes left and right engagement means secured adjacent to left and right rear corner portions of the flatbed truck respectively. Left and right movable means, in turn, are mounted adjacent to left and right front corner portions of the forklift vehicle in positions to engage the left and right engagement means on the truck respectively. Hydraulic power means carried by the forklift are coupled to the movable means for simultaneously moving the movable means in a manner to lift the front end of the forklift together with its front wheels free of the ground. The assembly is completed by the provision of locking means in the form of pins for securing the movable means to the engagement means on the truck so that the forklift vehicle will ride only on its rear wheels while being towed, thereby eliminating transmission wear which would otherwise result if the front wheels were rotated. Moreover, because of the capturing of the left and right front end portions of the forklift to the left and right rear corner portions of the truck during towing, the fore and aft longitudinal axis of the forklift remains in the same vertical plane as the fore and aft longitudinal axis of the towing truck so that there is no swaying or other problem normally encountered when a single point towing coupling is made. As a consequence, great stability ensues during towing operations.

BRIEF DESCRIPTION OF THE DRAWINGS

A better understanding of this invention will be had by now referring to the accompanying drawings in which:

FIG. 1 is a fragmentary perspective view of a forklift vehicle and rear portion of a flatbed truck, the forklift being in a position preparatory to being coupled to the truck for towing purposes;

FIG. 2 is a greatly enlarged fragmentary perspective view of a portion of the towing structure enclosed within the circular arrow 2 of FIG. 1;

FIG. 3 is an enlarged fragmentary perspective view of a portion of the towing structure looking in the direction of the arrow 3 of FIG. 1;

FIG. 4 is a fragmentary cross section of the components of FIGS. 2 and 3 in their connected positions;

DETAILED DESCRIPTION OF THE PREFERRED EMBODIMENT

Figure 5:
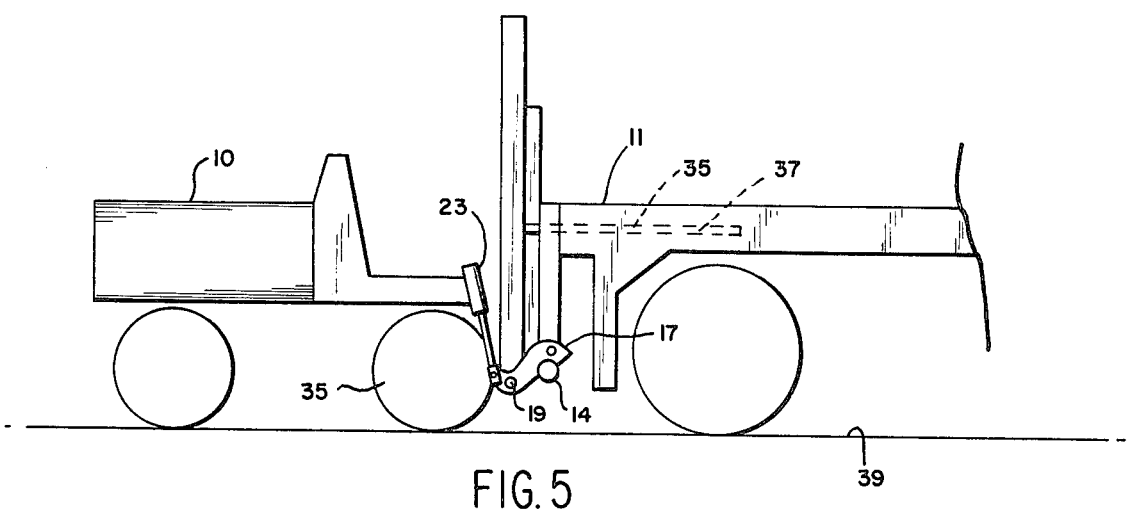
FIG. 5 is a highly schematic side elevational view showing initial coupling of the forklift to the rear of the truck.

Referring first to FIG. 1, there is shown a conventional forklift vehicle 10. In accord with the present invention, the forklift 10 is arranged to be towed by a load hauling flatbed truck, a rear fragmentary portion of which is shown at 11. By towing the forklift 10 to a remote site, the forklift vehicle can be used for loading and/or unloading operations and a driver of the truck need not wait around for delivery of an appropriate forklift by a customer at the remote site and thus waste valuable time.

The towing structure itself in accord with the present invention comprises a rigid frame including vertical frame members 12 and 13 secured to the rear of the truck bed 11 and extending vertically downwardly as shown. A cross bar of rounded configuration extends between and is secured to the lower ends of the frame members 12 and 13 as shown at 14. Opposite rounded end portions of the member 14 at their securement points to the lower ends of the frame members 12 and 13 define engagement means designated generally by the arrows 15 and 16. These engagement means are adjacent to the rear left and right corners of the truck bed 11. Bar 14 is parallel to the truck axle A—A.

Referring now to the lower front portion of the forklift vehicle 10, there are provided left and right movable means in the form of rocking levers 17 and 18 provided intermediate their ends as at 19 and 20 to points adjacent to front left and right corners of the forklift. The front ends of each of the rocking levers 17 and 18 include underside arcuate cut-outs 21 and 22 dimensioned to engage over the rounded engagement means 15 and 16 on the rear of the flatbed truck 11 as will become clearer as the description proceeds.

Appropriate power means in the form of hydraulic cylinder and pistons 23 and 24 carried by the forklift 10 include piston rods 25, 26 coupled to the rear ends of the rocking levers 17 and 18 as indicated at 27 and 28 respectively. The arrangement is such that the rocking members when pivoted around the pivot points 19 and 20 will serve to simultaneously raise the left and right front corner portions of the forklift 10 together with the front wheels free of the ground.

Referring now to the enlarged detail of FIG. 2, the engagement means 15 together with an appropriate locking means will be described in greater detail. The engagement means 16 described in FIG. 1 is essentially a mirror image of the structure 15 and thus a detailed description of the rear left end corner engagement means 15 will suffice for both.

Referring specifically to FIG. 2, there is provided a flange member 29 having an opening 30. The wall of the flange member 29 together with the inner facing wall of the frame member 12 define part of the engagement means 15 for receiving any corresponding rocking lever. In addition, the flange 29 constitutes part of a locking means for securing the rocking lever to the engagement means 15 after the front end of the forklift vehicle has been raised. Towards this end, there is provided the opening 30 in the flange 29. This opening is arranged to register with a corresponding opening 31 shown in FIG. 3 formed in the front end portion of the rocking member 17.

Referring back to FIG. 2, a locking pin 32 in turn is positioned to be passed through the opening 30 and the opening 31 of the rocking lever when in position to thereby secure the same to the engagement means 15. A biasing spring 33 may be provided for biasing the pin 32 from its supporting cylinder 34 into the opening 30, the same being shown retracted from the opening for purposes of clarity in FIG. 2.

Referring now to FIG. 3, it will be clear that when the hydraulic piston rod 25 is moved out of the cylinder 23, it will rock the rocking lever 17 about the pivot 19 to raise the front end portion to the dotted line position illustrated. In this position, the arcuate cut-out 21 can then be caused to engage the engagement means 15 between the flange 29 and the inner wall of the frame member 12. If now the hydraulic piston 25 is retracted into the cylinder 23 to lower the front end of the rocking lever 17, this action will raise the front end portion of the forklift together with its front wheels free of the ground. In this raised position, the openings 30 and 31 in the flange 29 and front end of the rocking lever 17 respectively will be in alignment and the pin 32 biased into these openings will simply pass through both openings to effect the desired locking. Disconnection can be effected by manually withdrawing the pin 32 from the aligned openings.

Referring to FIG. 4, the pin 32 is shown passing through the aligned openings 30 and 31 in the flange 29 and rocking lever 17 respectively. FIG. 4 represents the relative positions of the parts when the front of the forklift has been raised.

Referring once again to FIG. 1, it will be noted that the rear flatbed truck 11 includes in the end wall of the flatbed itself longitudinal slot openings or channels 35 and 36. These openings are designed to receive the fork tines of the forklift 10, these tines being indicated respectively at 37 and 38. Thus, when the forklift vehicle 10 is to be coupled to the rear of the flatbed truck 11, the fork tines are manipulated by operation of the normal hydraulics to be received in the channels 35 and 36.

Figure 6:
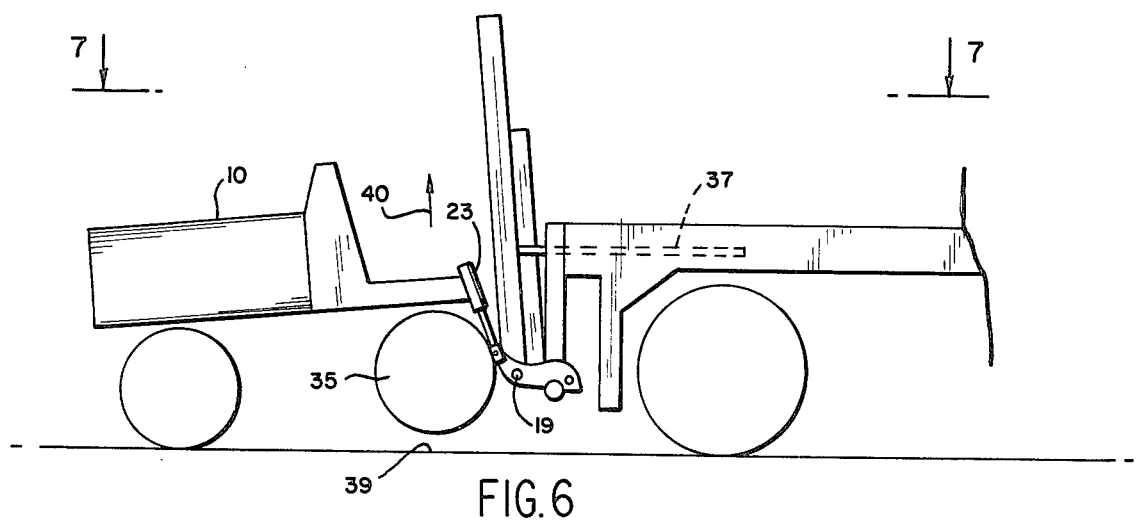
FIG. 6 is another highly schematic view similar to FIG. 5 but illustrating the raising of the front portion of the forklift in accord with the present invention for towing purposes.

The foregoing will become clearer by now referring to FIG. 5 wherein there is illustrated by the phantom lines the fork tine 37 within the channel 35. Further, the rocking member 17 is shown effecting an initial engagement with the horizontal rounded bar 14 secured to the end of the truck bed. The controls for the forklift tines are left free so that appropriate tilting and lowering of the forklift tines will automatically take place to accommodate raising of the front of the forklift itself upon operation of the hydraulic cylinders such as the cylinder 23 in FIG. 5. Simultaneous operation of the two hydraulic cylinders 23 and 24 described in FIG. 1 will rock the rocking members such as the member 17 in a clockwise direction as viewed in FIG. 5 about the pivot point 19 to thereby raise the front of the forklift 10 free of the ground 39 as illustrated in FIG. 6.

After the front of the forklift has been raised as described the locking pins are then passed through the appropriate openings since these openings are now in registration, all as described with respect to FIG. 4 and towing operations can start.

Figure 7:
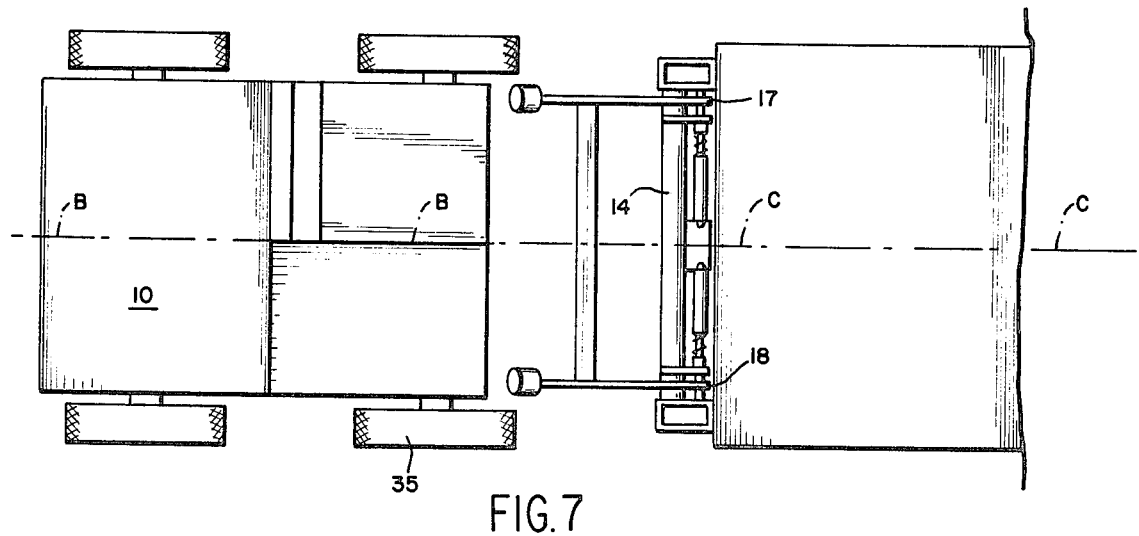
FIG. 7 is a top plan fragmentary schematic view looking in the direction of the arrows 7—7 of FIG. 6.

In the plan view of FIG. 7, it will be noted that the fore and aft longitudinal axis designated B—B in FIG. 7 lies in the same vertical plane and will remain in this same vertical plane as the fore and aft longitudinal axis for the truck indicated at C—C. Thus, because of the two point connection adjacent the left and right corners of the truck and the forklift, there will not result any swaying but rather the forklift vehicle will track accurately all movements of the truck itself.

Moreover, the forklift vehicle will only be riding on its rear wheels so that this motion will not be communicated to the power transmission train.

When the truck arrives at a site, the forklift can readily be disengaged from the truck by simply removing the locking pins, rotating the rocking levers in a counterclockwise direction to lower the front of the forklift and thence simply backing the forklift away.

From all of the foregoing, it will thus be evident that the present invention has provided a very useful forklift towing structure successfully solving the problems of towing forklift vehicles, all to the end that trucking and material handling operations can be more readily and efficiently carried out.

I claim:

1. A forklift towing structure for use in towing a forklift behind a load hauling flatbed truck with which the forklift vehicle is to be used at a remote site for loading and/or unloading operations, said structure including:

(a) a round bar secured in spaced relationship to the rear of said truck in a horizontal position parallel to the rear axle of the truck, opposite ends of said bar defining left and right engagement means;

(b) left and right movable means mounted intermediate their ends adjacent to left and right front corner portions of said forklift vehicle, in positions to engage said left and right engagement means respectively, said left and right movable means comprising rocking levers pivoted intermediate their ends at said points adjacent to said left and right front corners of said forklift vehicle, the front ends of said levers having underside arcuate cut-outs for engaging over said engagement means and (c) power means carried by said forklift vehicle coupled to said movable means for lowering the said movable means simultaneously to thereby lift the front end of said forklift together with its front wheels free of the ground; and (d) locking means including flange members secured to said round bar adjacent to said front ends of said rocking levers, said flange members and locking levers having holes which fall into registration when said underside arcuate cutouts engage said round bar and the front of said forklift vehicle is raised and pins insertable through said registering openings for securing of the movable means to the engagement means, whereby the left and right front corners of the forklift vehicle are captured to the left and right rear corners of the truck, the forklift vehicle being towed with only its rear wheels on the ground so that the longitudinal fore and aft axis of the forklift vehicle remains in the same vertical plane as the fore and aft longitudinal axis of said truck, thereby facilitating and stabilizing towing of the forklift vehicle.

2. The subject matter of claim 1, in which said power means comprises left and right hydraulic pistons and cylinders with extending piston rods coupled to the rear ends of said rocking levers respectively.

3. The subject matter of claim 2, including spring biasing means urging said pins through the openings in said flange members so that said pins are initially manually retractable when said front ends of said rocking levers engage over said round bar, the pins passing through the openings in the front ends of the rocking levers when the openings therein become aligned in registration with the openings in said flange members.

4. The subject matter of claim 3, in which the rear end of said flatbed truck includes longitudinal channels spaced to receive the fork tines of the fork on said forklift vehicle when said movable means engage said engagement means whereby said tines are nestled within said channels in an out-of-the-way position during towing operations.

* * * * *